United States Patent [19]

Denton et al.

[11] 4,372,902

[45] Feb. 8, 1983

[54] PREPARATION OF DENSE CERAMICS

[75] Inventors: Ivor E. Denton, Wantage; John W. Henney, Abingdon, both of England

[73] Assignee: United Kingdom Atomic Energy Authority, London, England

[21] Appl. No.: 337,025

[22] Filed: Jan. 4, 1982

Related U.S. Application Data

[63] Continuation of Ser. No. 159,626, Jun. 16, 1980, abandoned.

[30] Foreign Application Priority Data

Jun. 25, 1979 [JP] Japan .................................. 54-22096

[51] Int. Cl.$^3$ .............................................. C04B 35/56
[52] U.S. Cl. ........................................ 264/65; 501/88
[58] Field of Search ............................. 264/65; 501/88

[56] References Cited

U.S. PATENT DOCUMENTS

| | | | |
|---|---|---|---|
| 2,784,112 | 3/1957 | Nicholsen | 264/65 |
| 2,897,572 | 8/1959 | Hansen | 264/65 |
| 3,407,090 | 10/1968 | Hertl | 501/88 |
| 4,124,667 | 11/1978 | Coppola | 264/65 |
| 4,209,474 | 6/1980 | Prochazka | 264/65 |
| 4,224,073 | 9/1980 | Sasoki | 501/88 |

FOREIGN PATENT DOCUMENTS 1478898 7/1977 United Kingdom .

OTHER PUBLICATIONS

Prochazka, "The Role of Boron and Silicon in the Sinting of Silicon Carbide", *Special Ceramics*, Proc., vol. 6, (1975), pp. 171-181.

*Primary Examiner*—John A. Parrish
*Attorney, Agent, or Firm*—Larson and Taylor

[57] ABSTRACT

The invention is concerned with preparation of dense ceramics, in particular silicon carbide.

Silicon carbide is a useful structural material but difficulties of densifying by sintering have in the past created problems in the production of silicon carbide components. It is however known to use boron and carbon as additives to assist densification by sintering. In this invention a further improvement in densification is effected by carrying out such sintering in a carbon-containing reducing atmosphere such as a methane containing atmosphere. Surface silica which inhibits densification is thereby removed but without removing fine carbon.

5 Claims, No Drawings

PREPARATION OF DENSE CERAMICS

This is a continuation, of the application Ser. No. 159,626 filed June 16, 1980 now abandoned.

This invention relates to the preparation of dense silicon carbide bodies.

Silicon carbide possesses chemical and physical properties which make it an excellent material for high temperature structural applications. Such properties include good oxidation resistance and corrosion behaviour, good heat transfer coefficients, low thermal expansion coefficient, high thermal shock resistance and high strength at elevated temperature. Thus, silicon carbide has many potential uses in the form of various engineering components.

Production of components of silicon carbide has been made difficult in the past by problems of sintering pure silicon carbide in order to effect densification. However, S. Prochazka in "The Role of Boron and Carbon in the Sintering of Silicon Carbide", Special Ceramics 6 (1975), pages 171 to 181 has reported sintering of silicon carbide to densities near theoretical by utilising additions of several tenths of one percent boron and carbon to submicron $\beta$-SiC powders, Also, U.K. Patent Specification No. 1 478 898 describes production of dense silicon carbide ceramics by sintering shaped mixtures comprising $\beta$-SiC, a boron containing material in an amount equivalent to 0.3 to 3.0% by weight of boron, and a carbonaceous additive in an amount equivalent to 0.1 to 1.0% by weight of carbon.

We have now found that further improvements in density may be obtained by carrying out the sintering in a carbon-containing, reducing atmosphere.

Thus, the invention provides a method of preparing a dense silicon carbide body which comprises the steps of
 (i) forming into a green body a mixture comprising silicon carbide powder and additionally a boron containing material and a carbonaceous material; and
 (ii) sintering the green body in a carbon-containing reducing atmosphere to produce a dense silicon carbide body.

We have found that the use of the carbon-containing reducing atmosphere in accordance with our invention enables silicon carbide bodies of high density to be produced under conditions of so-called "pressureless" sintering (i.e. at atmospheric pressure and without any additional pressure being applied) and of higher density than if the sintering were carried out in an inert atmosphere. We believe that the carbon-containing, reducing atmosphere acts by aiding the decomposition of surface silica which is generally present on particles of silicon carbide powder and which inhibits densification of the silicon carbide, and does so without removing fine carbon (derived from the additive in step (i)), the presence of which is necessary for sintering to a high density. The invention is therefore particularly useful for densifying silicon carbide powder, the particles of which are badly contaminated by surface oxidation.

We prefer that the carbon-containing, reducing atmosphere comprises a hydrocarbon where methane is particularly preferred because of its stability. Our experiments have shown that the proportion of methane in the atmosphere may be varied over a wide range. We generally prefer to use proportions of less than 30% by volume since otherwise hydrogen formed by decomposition of the methane significantly increases the thermal conductivity of the atmosphere which leads to increased heat losses. We particularly prefer to use between 5% and 20% by volume of methane in an inert atmosphere usch as argon.

The atmosphere in step (ii) may be flowing or it may be static. If it is static, the reducing component of the atmosphere should be in excess of that needed to reduce the surface silica known to be present on the silicon carbide powder.

In step (i) the boron containing material and the carbonaceous material are additives useful as sintering aids and are known in the art for assisting the densification on sintering of SiC. They are referred to in the above-mentioned paper by S. Prochazka. The boron containing material may be in elemental form or it may be in compound form. Also, the carbonaceous material may be in elemental form or it may be in compound form provided it is capable of giving rise to elemental carbon in step (ii). Also, the boron containing material and the carbonaceous material may be constituted by a single material, namely boron carbide, but in combination with additional carbonaceous material in order to obtain correct stoichiometry.

The proportion of additives in the mixture in step (i) may cover a wide range and the proportion required will be determined to some extent by the particle size of the silicon carbide powder and by the sintering temperature in step (ii). For example, the boron containing material may be present in proportions in the range 0.3% to 10% by weight expressed as elemental boron based on the weight of silicon carbide, and the carbonaceous material may be present in proportions in the range 1% to 15% by weight expressed as elemental carbon based on the weight of silicon carbide. Such proportions have been found to be effective when the surface area of the silicon carbide powder lies in the range of 1.6 to 14 $m^2/g$ and the temperature of the sintering in step (ii) lies in the range of 1900° to 2400° C. In general we find that the higher the surface area of silicon carbide used, the lower is the proportion of additive and the lower is the temperature of sintering required in order to achieve a high density in the final product of our invention.

In carrying out our invention we prefer to use in step (i), silicon carbide powder with a surface area in the range of 7 to 14 $m^2/g$ and to carry out step (ii) at a temperature below 2200° C. This is in order to obtain a product with a high density and a small grain size, which is a desirable combination for a number of purposes. Silicon carbide powder in the above surface area range is usually badly contaminated by surface oxidation of the particles and would therefore be difficult to densify by sintering in the absence of the carbon-containing reducing atmosphere of our invention.

The invention will now be particularly described by way of example only in Examples 1 to 3 below. Also included below are Examples A to C which are for comparison purposes only and are not examples of the invention.

The general procedure in the examples was as follows. A commercially available $\alpha$-SiC powder of surface area 1.6 $m^2/g$ was ground to give a series of finer SiC powders of surface areas 3 $m^2/g$, 10 $m^2/g$ and 14 $m^2/g$ respectively. The oxygen content of each of the finer powders was estimated from the weight loss resulting from heating a sample of each powder in vacuo at 1700° C. A further sample of each of the finer powders was thoroughly mixed with 5% by weight of fine carbon as a solution of β-glucose in water and 4% by weight of boron as technical grade amorphous boron. The mixture was dried and partially decomposed at 200° C. to convert a proportion of the β-glucose to carbon. The mixture was then pressed at 400 MPa to a relative density of 60% to give compacts measuring 1 cm diameter by 0.3 cm thick. The compacts were placed in a carbon tube furnace of 30 l volume and sintered by heating for two hours to raise the temperature of the furnace from 20° C. to 2150° C. and heating for ten minutes at 2150° C. The sintering was carried out in a flowing atmosphere having a flow rate of 100 ml/minute. Compacts derived from powders of particular surface area were sintered in this way in an atmosphere of argon and 20% by volume of methane (Examples 1 to 3) and, for comparison purposes, similar compacts were sintered in an atmosphere of argon alone (Examples A to C). In all cases, the densities of the sintered compacts were measured by a standard liquid displacement method.

The results are summarised in the table below.

| EXAMPLE | SURFACE AREA OF INITIAL SiC POWDER ($m^2/g$) | OXYGEN CONTENT OF INITIAL SiC POWDER (% by weight) | DENSITY OF SINTERED COMPACT (g/ml) |
| --- | --- | --- | --- |
| 1 | 3 | 1 | 2.53 |
| A | 3 | 1 | 2.53 |
| 2 | 10 | 3 | 2.76 |
| B | 10 | 3 | 2.23 |
| 3 | 14 | 4.5 | 2.96 |
| -continued | | | |
| C | 14 | 4.5 | 2.13 |

It will be seen from the table that a marked increase in density of the sintered compact is achieved by inclusion of methane in the sintering atmosphere and when the initial SiC powder has a high surface area and a high oxygen content.

We claim:

1. In a method of preparing a dense silicon carbide body by forming into a green body a mixture comprising silicon carbide powder having a surface area in the range from 3 $m^2/g$ to 14 $m^2/g$ and additionally a boron containing material and a carbonaceous material, and sintering the green body to produce the dense silicon carbide body, the improvement wherein the sintering is carried out in a methane-containing atmosphere, methane constituting less than 30% by volume of said atmosphere.

2. A method according to claim 1, wherein methane constitutes from 5% to 20% by volume of the atmosphere.

3. A method according to claim 1, wherein the silicon carbide powder has a surface area in the range from 7 $m^2/g$ to 14 $m^2/g$.

4. A method according to claim 1 wherein the sintering is carried out at a temperature below 2200° C.

5. A method according to claiam 1, wherein the boron containing material is present in proportions in the range 0.3% to 10% by weight expressed as elemental boron, based on the weight of silicon carbide and the carbonaceous material is present in proportions in the range 1% to 15% by weight expressed as elemental carbon based on the weight of silicon carbide.

* * * * *